Patented Dec. 12, 1939

2,183,395

UNITED STATES PATENT OFFICE 2,183,395

LIGHT-SENSITIVE MATERIAL FOR PRODUCING PHOTOGRAPHIC DYE IMAGES

Béla Gaspar, Brussels-Forest, Belgium

No Drawing. Application January 27, 1939, Serial No. 253,229. In Great Britain December 12, 1938

5 Claims. (Cl. 95—2)

It is already known that photographic dye images can be produced from uniformly colored photographic layers by local destruction of the dye and that the action of the treating solutions used for this purpose can be accelerated by adding to these solutions various substances which act as catalysts in the dye-destroying reaction.

It is an object of the present invention to improve this process and to render it more economical and more uniform. It is a further object to obtain an exact dosage of the catalyst and to ascertain a constant and invariable proportion of the catalyst. A further object is to predetermine, by the amount of the catalyst, the desired bleaching speed of the dye present in the photographic layer and to balance the bleaching speed of different layers so that the bleaching properties of different dyes can be adjusted. For these and further objects which will become apparent from the following description I use silver halide emulsion layers to which I have added a catalyst. This catalyst has the property of accelerating the dye-destroying action of the treating solutions, which may be selected from those described in my prior Patent No. 2,020,775, November 12, 1935.

The invention further relates to photographic multilayer materials formed by several silver halide emulsion layers which are sensitive to different spectral lights. One at least of the layers contains a substance that acts as a catalyst in the process of dye destruction. The multilayer material may be composed of colored layers or of uncolored layers, or of colored and uncolored layers combined, and the uncolored layers may contain dye-forming substances from which dyes may be produced after the exposure.

For the production of the multilayer material silver halide emulsions may be used that either contain the catalyst without the dye, the dye not being applied until the emulsion layer has been exposed but prior to the dye destruction, or that contain prior to exposure both the catalyst and the dye to be used for the formation of the dye-image, or that contain the catalyst and the dye-forming substance which after exposure is converted into the dye used for the formation of the dye-image.

The reference to emulsions that contain the catalyst alone is intended to include those emulsions in which the catalyst has been fixed by the addition of a precipitating agent that forms an insoluble compound with the catalyst and thus prevents it from wandering or from being washed out. In the same manner such precipitating agents might be used in emulsions that contain the catalyst and the dye, or that contain the catalyst and a dye-forming substance. In the last two cases the precipitating agent for the catalyst may simultaneously act as precipitant for the dye or dye-forming substance or alternatively the dye or dye-forming substance may undergo mutual precipitation with the catalyst. If, however, the catalyst be a substance that is practically insoluble and does not diffuse or if it be a substance that can be washed out from the binding agent of the emulsion only with difficulty, or if it be a substance to which the property of insolubility or fastness has been imparted by chemical substitution, the catalyst may be used without precipitant.

The binding agent of the emulsion may be gelatin or cellulose derivatives or artificial resins or albuminoids or other colloids suitable for this purpose. The effects obtained by practising the invention are illustrated by the following example.

If a silver halide emulsion is dyed with Supranolbrillantrot B (Schultz Farbstofftabellen, Supplement, 7th Ed., 1934, page 136) and a silver image produced therein, destruction of the dye by aqueous hydrohalic acid solution takes a comparatively long time. However if there is present at the same time a very small quantity of sulphonated 3.3'- carbonyl - bis - 2-oxy-3-amino-phenazine as a catalyst, the dye destruction is considerably accelerated.

Example

The following substances are mixed in the order given, viz.:

Silver halide emulsion (ordinary positive
 emulsion) _____ cc__ 150
2% solution of supranobrillantrot B____do__ 100
10% solution of the acetate of the dibiguan-
 ide derived from dichlorbenzidine____cc__ 20
Sulphonated 3.3'-carbonyl-bis-2-oxy-3-ami-
 no-phenazine_____mg__ 10
  dissolved in 20 cc. water, 10 cc. ethyl alco-
  hol, to which has been added 1 g. sodium
  acetate.

The dyed silver halide emulsion thus produced is coated on a surface of one square metre.

A control plate is made in exactly the same manner as above described, with the sole difference that in preparing the mixture the sulphonated 3.3'- carbonyl - bis - 2-oxy-3-amino-phenazine is not included.

The two plates are simultaneously exposed side by side under the same wedge; they are afterwards treated in an alkaline metol-hydroquinone developer, fixed and dried. Thereupon the two plates are immersed in the dye destroying bath for 20 minutes at 18° C., the solution being 1.5% hydrochloric acid with an admixture of 0.2% potassium iodide. The plates are washed in water, the silver is converted into silver halide and afterwards fixed out. Processing under these conditions, it will be found that a distinct dye-image is obtained in the emulsion layer that had been prepared to include the catalyst, whereas the layer prepared without the catalyst shows practically no dye-image.

The sulphonated 3:3'-carbonyl-bis- 2-oxy-3-amino-phenazine used as catalyst in the above example is prepared as follows:

5 g. of 2-oxy-3-amino-phenazine (see Berichte der deutschen Chemischen Gesellschaft, vol. 35, page 4303) are added whilst cooling to a mixture of 20 cc. concentrated sulphuric acid and 10 cc. fuming sulphuric acid having a sulphur trioxyde content of 66%. The solution becomes hot and is kept for about 3 or 4 days at a temperature of about 90° C. and thereafter poured on ice. Common salt is added and the precipitate obtained is recrystallized from water. 4 g. of red needles are obtained.

0.3 g. of this product are dissolved in 100 cc. 2-normal sodium carbonate solution and phosgene is introduced into this solution at room temperature. The carbonyl-compound precipitates and is filtered off and dried. The substance is easily soluble in sodium carbonate solution, less soluble in alcohol and as distinguished from the sulphonated 2-oxy-3-amino-phenazine almost insoluble in diluted acids.

The dibiguanide derived from dichlorbenzidine used as a precipitant for the dye in the above example is prepared as follows:

50 cc. of an aqueous suspension of 25 g. m-dichlorbenzidine are heated to boiling with 20 cc. hydrochloric acid ($d=1.19$) and 25 g. dicyandiamide are slowly added through 5 minutes. After further 15 minutes heating the hydrochloride of the dibiguanide deposits out. It is filtered off and suspended in hot water. The free base is obtained by addition of sodium hydroxide and cooling. The base is washed with water and dissolved in the computed quantity of 2-normal acetic acid. The solution is boiled with decolorizing carbon, filtered and cooled. The acetate of the dibiguanide is obtained in the form of colorless crystals.

The emulsion including the catalyst referred to above, or emulsions prepared in a similar manner, or of similar composition, or in which other dyes, other dye-forming substances or other catalysts are used may be united with other emulsion layers to form a multilayer light-sensitive material, the various layers being applied on the one side or on both sides of a support with the addition of suitable sensitizers that impart to the superposed layers a sensitivity to different spectral regions. Intermediate layers of plain colloid may be interposed between successive coatings of emulsion. The structure of the multilayer material as far as the sensitizing and the coloring is concerned is in accordance with the known principles, as described, for example, in my prior Patent No. 1,985,344, December 25, 1934, or my copending applications No. 642,960, filed November 16, 1932, and No. 156,031, filed July 27, 1937.

For example, the emulsion dyed with Supranolbrillantrot B and containing the catalyst as in the example described above is used for producing one layer of a two-layer material the other layer of which is formed by 290 cc. per square metre of an emulsion prepared from Silver halide emulsion_____cc__ 200
1,5% aqueous solution of the dye Brillantbenzoechtgruen GL (see Chemisches Zentralblatt 1935, vol. I, page 1452)_____cc__ 90

This emulsion layer without the addition of a catalyst is transformed into a dye-image by immersion for about 20 minutes at 18° C. in the dye-destroying solution used in the above example, the silver image in the layer having been obtained under the same conditions as that in the red colored emulsion described above.

A three layer material may be formed by superposing a third emulsion layer which might be colored or colorless.

For transforming the exposed emulsion layers into dye-images, emulsion layers that contain no dye are colored after exposure by incorporating the dye or by transforming the dye-forming substance into the dye. Thereafter the colored layers are locally decolorized. For decolorizing, the methods described in my prior Patent No. 2,020,775, November 12, 1935, are especially suitable. It is, however, not always necessary to use a separate dye-destroying solution for the treatment of the developed silver picture. If, for example, the developed but not fixed silver-image is treated with a strong fixing bath, such as for instance an acid sodium hyposulphite solution of 20% the catalyst present in the film itself acts in such a manner that the dye destruction occurs in the fix'ng bath itself.

The presence of the catalyst within the layer has great advantage, for instance an economy as regards the amount of the catalyst necessary, a constant and invariable proportion of the catalyst that has the effect of rendering the process of dye-destruction more uniform, and the possibility of exact dosage of the catalyst. This exact dosage of the catalyst has the further advantage that a definite and desired bleaching speed can be pre-determined. Within a wide range any desired bleaching speed of the dye in the layer may thus be obtained. Therefore the bleaching speed in different layers can be balanced with respect to each other, either by different amounts of the catalyst or by the use of different catalysts in the various layers. By equalizing or by balancing the bleaching speed of the dyes, the gradation of the final multi-color image can be adjusted to the best value. The addition of the catalyst to the light-sensitive layer has the further advantage for the user of the material that the treatment solutions be of a similar composition and can be controlled more easily. The use of an additional catalyst in the treating solutions is, however, quite possible.

Suitable catalysts are described in my copending application No. 179,591, filed December 13, 1937. Examples of catalysts which are substituted in such a manner that the tendency to diffusion is diminished, are the 2-lauroyl-amino-3-amino-phenazine and the 2-stearoyl-amino-3-amino-phenazine which can be produced by refluxing 2,3-diamino-phenazine with lauroyl chloride or stearoyl chloride in molecular proportions for about two hours, pouring the mass into water and washing with diluted alkali.

What is claimed is:

1. A light sensitive material for color photographic purposes comprising on a common support a plurality of silver halide emulsion layers containing dyes which are capable of being locally bleached at relative greater and lesser speeds in a treating solution by reduction in the presence of a metallic silver image, one of said silver halide emulsion layers containing a dye of relative lower bleaching speed and a catalyst for increasing the speed of reduction of the dye contained within said layer to adjust the relative bleaching speed of the said dyes, said catalyst having no adverse effect upon the silver halide emulsion and being non-removable by ordinary photographic solutions.

2. A light-sensitive multilayer material comprising several silver halide emulsion layers on a common support one silver halide layer containing both a dye that is resistant to ordinary developers but capable of being locally bleached by reduction in the presence of a metallic silver image, and a catalyst for dye reduction, at least one other layer comprising a dye of different shade and of a higher inherent bleaching speed, the amount of catalyst being such as to render the bleaching speed of the first dye substantially equal to that of the other dye.

3. A process for producing multicolor photographic dye-images, which comprises incorporating differently colored dyes into the different layers of a photographic material carrying different silver halide emulsion layers on a common support, the dyes being resistant to ordinary developers but capable of being locally bleached by reduction in the presence of a metallic silver image and being of different bleaching speed, incorporating a catalyst for dye reduction into the layer dyed by the dye of lower bleaching speed and thereafter bleaching out the dyes by reduction at the place of the metallic silver deposit produced in the said photographic layers.

4. A material for color photographic purposes comprising on a common support a plurality of differently and uniformly dyed colloid layers containing silver images and dyes which are capable of being locally bleached at relative greater and lesser speeds in a treating solution by reduction in the presence of a metallic silver image, one of said colloid layers containing a dye of relative lower bleaching speed and a catalyst for increasing the speed of reduction of the dye contained within said layer to adjust the relative bleaching speeds of the said dyes.

5. A process for producing multicolor photographic dye images which comprises treating a multilayer material with a bleaching solution that acts to bleach out dyes by reduction in the presence of metallic silver, said multilayer material comprising on a common support a plurality of differently and uniformly dyed colloid layers containing silver images and dyes which are capable of being locally bleached at relative greater and lesser speeds in said bleaching solution, one of said colloid layers containing a dye of relative lower bleaching speed and a catalyst for increasing the speed of reduction of the dye contained within said layer to adjust the relative bleaching speeds of the said dyes in said bleaching solution.

BÉLA GASPAR.